July 12, 1955   A. PETERSON   2,712,945
DRAFT CONNECTION FOR TRAILER WITH CASTOR WHEELS
Filed Aug. 27, 1951
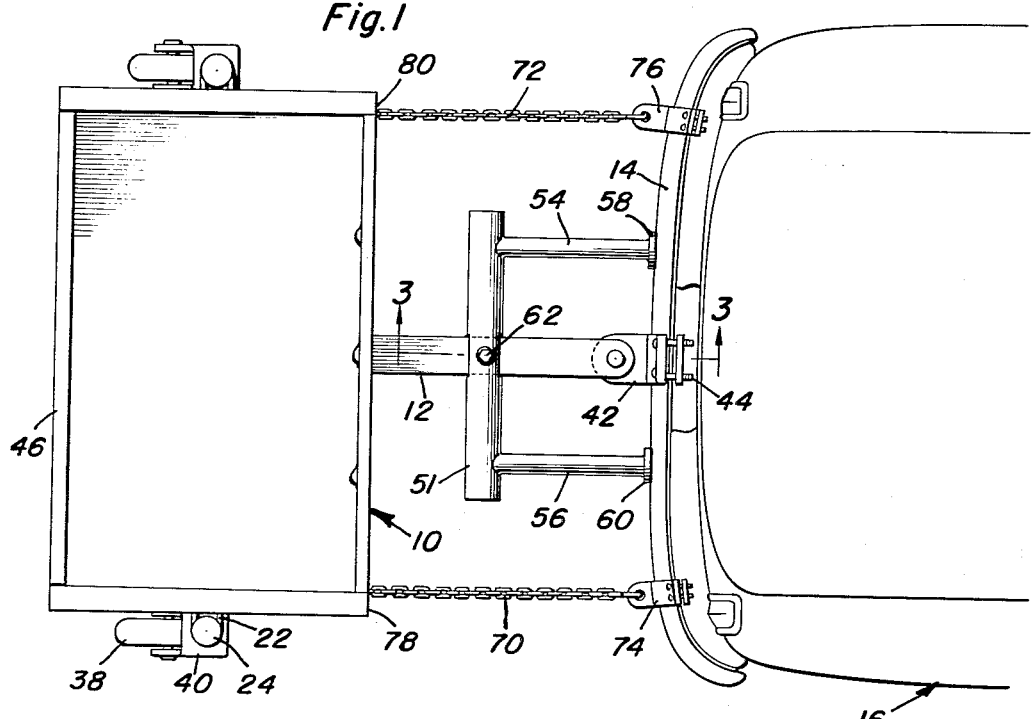
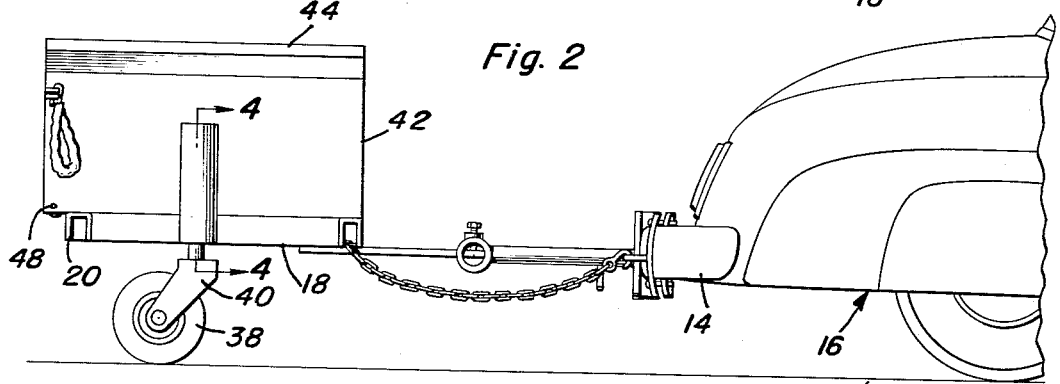
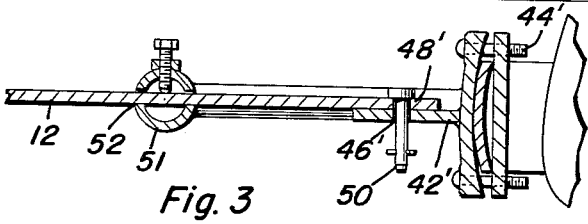
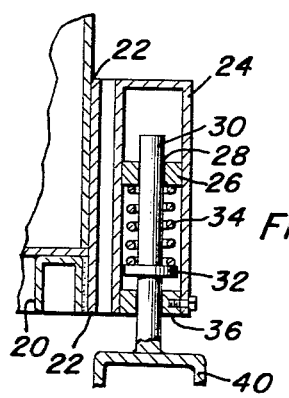
Alfred Peterson
INVENTOR.

United States Patent Office 2,712,945
Patented July 12, 1955

2,712,945

DRAFT CONNECTION FOR TRAILER WITH CASTOR WHEELS

Alfred Peterson, Chicago, Ill.

Application August 27, 1951, Serial No. 243,815

2 Claims. (Cl. 280—29)

This invention relates to a trailer and particularly an improved hitch for a single draw bar castor mounted trailer.

In the operation of castor mounted trailers it is very desirable that the trailer be rigidly attached to the drawing vehicle so that it follows directly behind the drawing vehicle without moving from side to side or lurching about as it would meet obstructions in the highway. Also it is necessary or at least very much desirable to have a rigid mount so that the tractor and its trailer can be backed up without jack-knifing.

Heretofore it has been necessary to utilize a plurality of draw bars or tractor attachments in order to secure the necessary rigidity between the drawing vehicle and the trailer. The present invention however utilizes a single draw bar attachment between the trailer and the drawing vehicle and utilizes brace bars mounted on the single draw bar and contacting the vehicle at spaced apart points for securing the necessary rigidity between the trailer and the tractor vehicle.

In utilizing trailers it is entirely desirable to have as much of the weight of the trailer and the load in sprung relation as is possible to have. In this invention, the castor wheels are mounted in brackets and springs interposed between the brackets proper and the castor wheels so that the only unsprung weight is the castor wheels and the mount therefor.

It is accordingly an object of this invention to provide a castor tractor having a single draw bar attachment to the drawing vehicle.

It is a further object of this invention to provide an improved castor mounted trailer.

It is a further object of this invention to provide an improved castor mount for castor wheels on a tractor.

It is a further object of this invention to provide a brace mounting for rigidly mounting a trailer behind the tractor vehicle.

Other objects and many of the attendant advantages of the invention will be apparent from the following detailed description taken in conjunction with the accompanying drawings, in which:

Figure 1 is a top plan view of the trailer of the invention showing the attachment of the same to a vehicle;

Figure 2 is a side elevation of the tractor and trailer as shown in Figure 1;

Figure 3 is an enlarged sectional view of the improved hitch, taken substantially on the plane indicated by the line 3—3 of Figure 1; and Figure 4 is a vertical section through the castor mounts, taken substantially on the plane indicated by the line 4—4 of Figure 2.

In the exemplary embodiment of the invention a trailer 10 has a single draw bar 12 attached to a portion such as the bumper 14 of a vehicle 16. While for simplicity of illustration the draw bar is shown as being coupled to the bumper of the vehicle 16 it will of course be understood that for all heavy work, the draw bar will be connected to some more sturdy portion such as the frame of the vehicle held preferably by means of the usual tractor hitch.

The trailer 10 includes a rectangular frame 18 constructed of light structural members usually light metal channels 20. Wheel brackets 22 are rigidly connected to the frame 18 by any suitable means such as welding. The brackets 22 are disposed laterally of the frame and preferably the frame is of such dimensions that the brackets are substantially in line with the wheel bearings of the drawing vehicle. Rigidly secured to a wheel bracket 22 is a substantially cylindrical mounting housing 24 having intermediate the ends thereof a guide bearing 26 rigidly secured within the housing 24 and having a central passage 28 in which is slidably and rotatably mounted a wheel post 30. Rigidly secured on the wheel post 30 is a bearing collar 32 slidably and rotatably received in the bore of the housing 24. A compression spring 34 is interposed between the bearing 26 and the collar 32 so that the weight of the load and the trailer is transmitted to the wheels by means of the spring 34 so that substantially the entire weight of the trailer and its load is sprung that is it is supported by springs so that only the weight of the wheel and the mounting thereof is unsprung. Preferably a stop member 36 is secured in the housing 24 to prevent the collar 32 and the wheel post from being accidentally removed from the housing 24.

Wheels 38 are journaled in forks 40 rigidly secured to the lower ends of the wheel post 30. Any suitable type of body may of course be mounted on the frame 20 such as the box-like bed 42 having outwardly flared side boards 44 and a tail gate 46 pivotally mounted on the body by means of the pins 48.

The draw bar 12 is rigidly attached to the frame 18 substantially centrally thereof and extends longitudinally from the frame so as to be extended into proximity with the vehicle 16. A suitable coupling herein shown as a bracket 42' firmly connected to the bumper 14 by means of suitable fasteners 44'. The bracket 42' is provided with a hole 46' which cooperates with a hole 48' in the draw bar 12 and the two are thereby coupled together by means of a pin 50. Since the pin coupling would permit lateral sway of the trailer lateral braces have been provided between the draw bar 12 and the vehicle portion such as the bumper 14. The brace members comprise a yoke 51 having a passage 52 therein so that the draw bar 12 is slidably received in the passage 52 in the yoke 51. The yoke 51 is thereby slidably adjustable along the draw bar 12. Brace arms 54 and 56 are rigidly connected to the yoke 51 in spaced relation to the draw bar 12 and extend in substantially parallel relation thereto. The brace arm 54 is provided with a pad 58 for contact with some portion of the vehicle such as a portion of the bumper 14. Likewise the brace arm 56 is provided with a pad 60 also for contact with a portion of the vehicle.

In connecting the trailer 10 to the vehicle 16 the yoke 51 is slid down the draw bar 12 so that the pads 58 and 60 are removed from contact with the vehicle. The trailer is then aligned at the desired angular relation with respect to the tractor vehicle 16 and the draw bar connected to the bracket by means of the coupling pin 50. The yoke 51 is then slid along the draw bar 12 until the pads 58 and 60 are in contact with the desired portion of the vehicle after which the yoke is rigidly locked in place on the draw bar 12 by means of the set screw 62. The brace members 54 and 56 in conjunction with the draw bar 12 rigidly support the trailer 10 directly behind the tractor vehicle and as the trailer is castor wheel mounted it readily follows where ever the car may go.

As an additional safety measure safety chains 70 and 72 are connected to brackets 74 and 76 firmly established on some portion such as the bumper 14 of the vehicle 16 and the chains 70 and 72 are then firmly attached to the front corners 78 and 80 of the trailer 10.

While for purposes of illustration a specific embodiment of the invention has been shown and described according to the best present understanding thereof, it will be apparent to those skilled in the arts, that many changes and modifications, can be made therein without departing from the true spirit of the invention.

Having described the invention, what is claimed as new is:

1. In a trailer construction having a rigid frame, a rigid hitch for connecting the trailer to a vehicle comprising a draw bar rigidly attached to said frame, a bumper on a vehicle, a bracket mounted on said bumper, a coupling pin securing said draw bar to said bracket, a yoke adjustably mounted on said draw bar, a pair of brace arms rigidly mounted on said yoke, said yoke being adjustable on said draw bar to bring said arms into contact with said bumper, means for locking said yoke in adjusted position on said draw bar.

2. In a trailer construction having a rigid frame, and a pair of castor wheels secured to said frame laterally of said body, a rigid hitch comprising a draw bar rigidly attached to said frame, a bracket adapted for connection on the bumper of an automotive vehicle, a coupling securing said draw bar to said bracket, a yoke longitudinally adjustable on said draw bar, a pair of brace arms rigidly attached to said yoke and adapted to make contact with said bumper, means to lock said yoke on said draw bar said yoke and said arms maintaining said trailer rigid against side sway with respect to said vehicle.

References Cited in the file of this patent

UNITED STATES PATENTS

| | | |
|---|---|---|
| 251,949 | Risdon | Jan. 3, 1882 |
| 475,366 | Ward | May 24, 1892 |
| 752,684 | Kelley | Feb. 23, 1904 |
| 918,161 | Jonas | Apr. 13, 1909 |
| 1,088,330 | Decker | Feb. 24, 1914 |
| 1,138,467 | Gilliland | May 4, 1915 |
| 1,234,788 | Milner | July 31, 1917 |
| 1,325,162 | McGriff | Dec. 16, 1919 |
| 1,573,320 | Kline | Feb. 26, 1926 |
| 1,788,391 | Green | Jan. 13, 1931 |
| 2,085,260 | Keys | July 29, 1937 |
| 2,187,411 | Bechman | Jan. 16, 1940 |
| 2,252,135 | Oyler | Aug. 12, 1941 |
| 2,475,174 | Boone | July 5, 1949 |
| 2,570,482 | Pruitt | Oct. 9, 1951 |